United States Patent [19]

Yoshio et al.

[11] Patent Number: 4,723,598
[45] Date of Patent: Feb. 9, 1988

[54] WARMING PANEL

[75] Inventors: Nishimoto Yoshio, Kawanishi; Nakamura Kiyoshi; Matsui Susumu, both of Nakatsugawa, all of Japan

[73] Assignee: Mitsubishi Denki Kabushiki Kaisha, Tokyo, Japan

[21] Appl. No.: 846,490

[22] PCT Filed: Mar. 2, 1984

[86] PCT No.: PCT/JP84/00077
§ 371 Date: Nov. 2, 1984
§ 102(e) Date: Nov. 2, 1984

[87] PCT Pub. No.: WO84/03551
PCT Pub. Date: Sep. 13, 1984

Related U.S. Application Data

[63] Continuation of Ser. No. 672,243, Nov. 2, 1984, abandoned.

[30] Foreign Application Priority Data

Mar. 2, 1983 [JP] Japan ................. 58-34133
Mar. 2, 1983 [JP] Japan ................. 58-34134

[51] Int. Cl.4 .................. F24H 3/00; B29C 65/00
[52] U.S. Cl. ......................... 165/136; 165/56; 264/46.5
[58] Field of Search ............ 165/56, 136; 264/46.5, 264/46.6, 46.7; 62/451

[56] References Cited

U.S. PATENT DOCUMENTS

| 2,653,139 | 9/1953 | Sterling | 264/46.5 |
|---|---|---|---|
| 2,983,963 | 5/1961 | Jodell et al. | 264/46.6 |
| 2,993,233 | 7/1961 | Hoppe et al. | 264/46.5 |
| 3,081,488 | 3/1963 | Casavina et al. | 264/46.5 |
| 3,132,382 | 5/1964 | Magester | 264/46.6 |
| 3,137,744 | 6/1964 | Burrus | 264/46.5 |
| 3,209,056 | 9/1965 | Jacobs | 264/46.5 |
| 3,221,085 | 11/1965 | Rill, Jr. et al. | 264/46.5 |
| 3,249,486 | 5/1966 | Voisinet et al. | 264/46.5 |
| 3,383,440 | 5/1968 | Chaldekas | 264/46.5 |
| 3,440,308 | 4/1969 | Carbaly et al. | 264/46.5 |
| 3,444,280 | 5/1969 | Pulaski | 264/46.5 |
| 3,446,881 | 5/1969 | Poole | 264/46.5 |
| 3,904,721 | 9/1975 | Puterbaugh | 264/46.5 |
| 4,102,721 | 7/1978 | Carey, Jr. | 264/46.5 |
| 4,118,451 | 10/1978 | Schaus | 264/46.5 |
| 4,212,348 | 7/1980 | Kobayashi | 165/136 |
| 4,240,999 | 12/1980 | Decker, Jr. | 264/46.5 |
| 4,306,616 | 12/1981 | Woods, Jr. et al. | 165/136 |

FOREIGN PATENT DOCUMENTS

| 2020205 | 11/1971 | Fed. Rep. of Germany | 165/136 |
|---|---|---|---|
| 40-14579 | 7/1965 | Japan | 264/46.5 |
| 42-7187 | 3/1967 | Japan | 264/46.5 |
| 66309 | 8/1973 | Japan | 264/46.5 |
| 38159 | 4/1975 | Japan | . |
| 152249 | 12/1976 | Japan | . |
| 0015163 | 2/1977 | Japan | 165/136 |
| 54-128856 | 10/1979 | Japan | . |
| 0107434 | 8/1980 | Japan | 264/46.5 |
| 0157736 | 12/1981 | Japan | 165/56 |
| 0157735 | 12/1981 | Japan | 165/56 |
| 6734 | 1/1982 | Japan | 264/46.5 |
| 8129 | 1/1982 | Japan | 264/46.5 |

Primary Examiner—William R. Cline
Assistant Examiner—John K. Ford
Attorney, Agent, or Firm—Oblon, Fisher, Spivak, McClelland & Maier

[57] ABSTRACT

In a warming panel of a construction, wherein liquid for a heat insulating layer (3) is injected into an interior space of an outer shell structure (8) of a hollow planar construction, there is provided a buffer plate (13) or a flow guide plate (20) in the interior of the abovementioned outer shell structure (8), where the abovementioned liquid to be injected is impinged, to thereby restrict the flowing direction of the liquid as injected so as to make it possible to prevent the high pressure injected liquid from impinging on those fixed parts (6) provided in the outer shell structure (8) or those connected portions (1B) of the outer shell structure, thus avoiding unnecessary shifting of the fixed parts (6), or deformation or damage of the connected portions of the outer shell structure (8).

8 Claims, 8 Drawing Figures

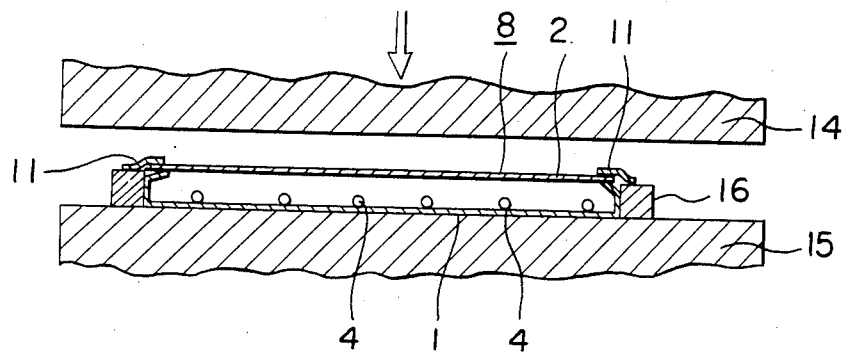
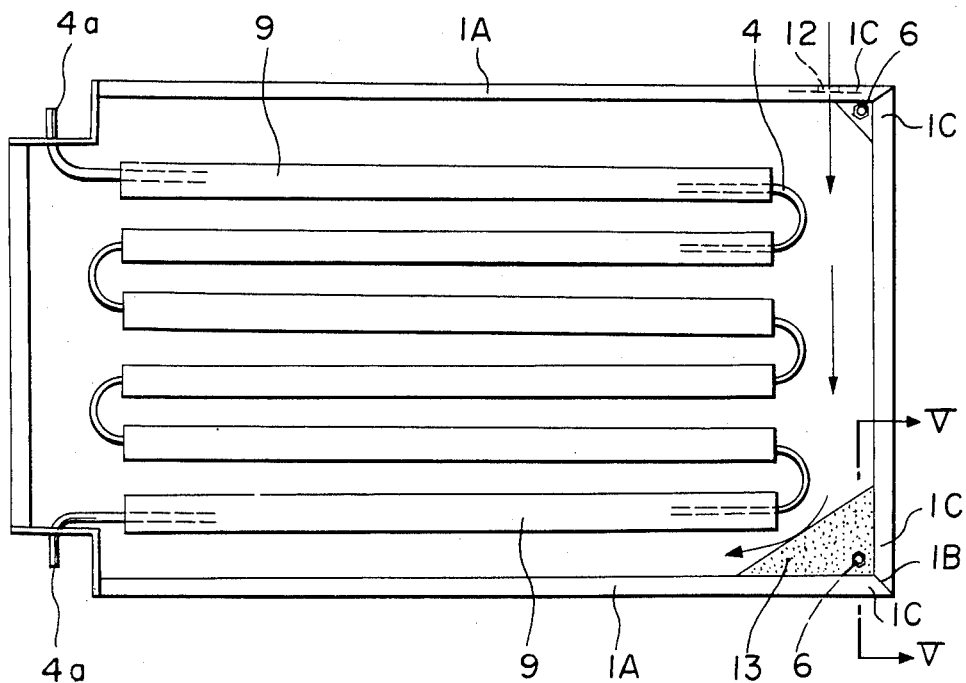

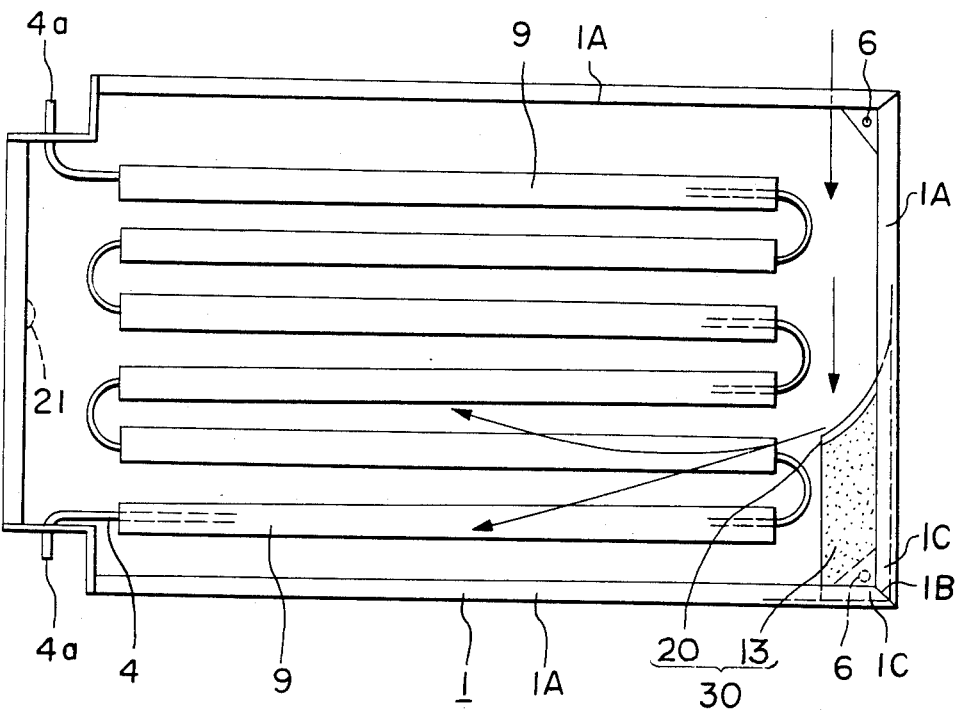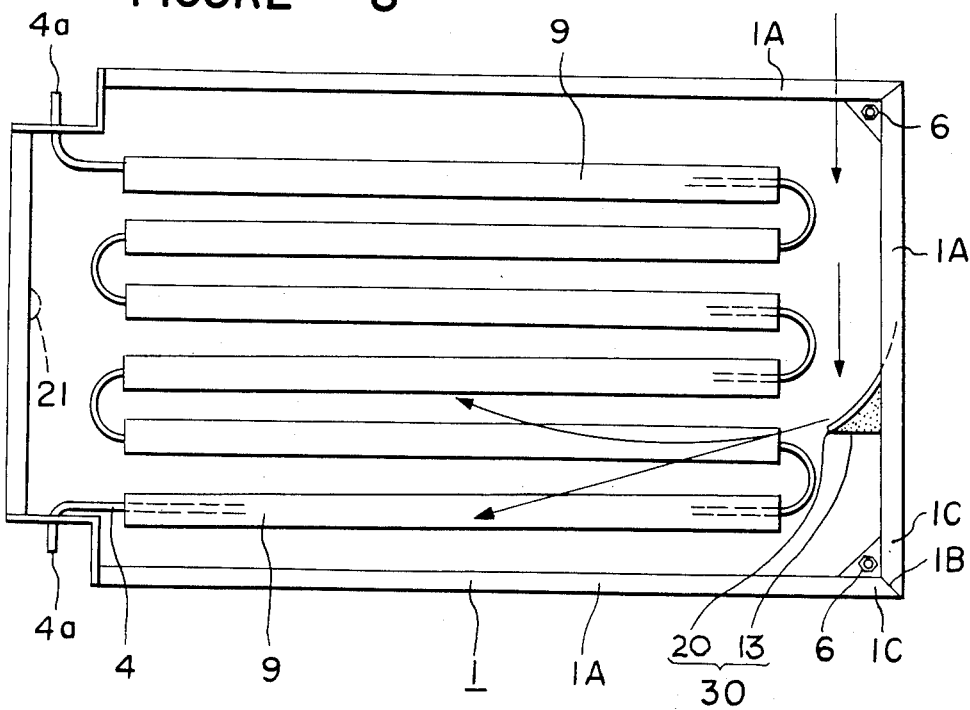

WARMING PANEL

This application is a continuation of application Ser. No. 672,243, filed Nov. 2, 1984, now abandoned.

TECHNICAL FIELD

The present invention is concerned with a warming panel provided in its interior with a heat insulating layer formed by injecting liquid of urethane foam, or the like.

BACKGROUND TECHNOLOGY

In general, various panels such as floor warming panel, etc. have so far been manufactured by injecting liquid of a heat insulating material such as urethane foam, etc. into an outer shell structure interior in a hollow planar shape with conduit tube for passing heating medium through it being arranged, thereby forming an integral heat insulating layer. However, in injecting liquid of the heat insulating material such as urethane foam, etc. into the outer shell structure, the liquid running at a high speed collides with the outer shell structure, which tends to cause displacement of those fixed parts such as stud nuts which have been tentatively secured at positions inside the outer shell structure, where they meet the gushing liquid of the insulating material, or breakage and damage to those joined portions at such colliding positions with the consequent high rate of yield of disqualified product.

Similarly, in the injection into the outer shell structure of the liquid such as urethane foam, etc., the liquid running at a high speed collides with the inner wall of the outer shell structure opposite to the injection port from the direction substantially perpendicular to it, on account of which the liquid in the outer shell structure takes a random flowing direction to cause, in most cases, unfilled portion, i.e., mold cavity to be created at the center part of the outer shell structure which is structurally unstable with the consequent high rate of yield of disqualified product.

OBJECTS OF THE INVENTION

It is the primary object of the present invention to provide a warming panel which is substantially free from displacement of the fixed parts, and damage or deformation of the joined portions.

It is the secondary object of the present invention to provide a floor warming panel which is able to control the charging direction of the liquid, and to leave the unfilled portion at a location in the outer shell structure having no structural vulnerability.

SUMMARY OF THE INVENTION

One of the characteristics of the present invention resides in the provision of a buffer member in the outer shell structure, which prevents the liquid from directly colliding with the fixed parts and joined portions, in such a manner that it may be oppositely positioned to the charging port of the heat insulating liquid, thereby making it possible to prevent displacement of the fixed parts, or damage or deformation of the joined portions, to be resulted from injection of the liquid under high pressure, and thereby reducing production of disqualified product.

Another characteristic of the present invention resides in the provision of a flow guide plate, which restricts the flowing direction of the liquid being injected at a high speed into the outer shell structure, in such a manner that the ultimate charged portion may come to the side of a predetermined end face of the outer shell structure, thereby making it possible to prevent displacement of the fixed parts, or damage or deformation of the joined portions to be brought about by collision of liquid by its injection, thereby making it possible that no unfilled portion of the injection liquid may be formed at the center part of the outer shell structure which is structurally unstable, and thereby making it possible to reduce remarkably a rate of yield of disqualified product.

BRIEF EXPLANATIONS OF THE DRAWING

FIG. 3 is a longitudinal cross-sectional view showing a state of setting the outer shell structure in an injection press mold prior to injection of the liquid;

FIG. 4 is an explanatory diagram showing a state of flow of the liquid at the time of its injection;

FIGS. 7 and 8 are respectively explanatory diagrams of the floor warming panel, which show still other embodiments of the present invention.

THE BEST MODE TO PRACTISE THE INVENTION

Figure 1:
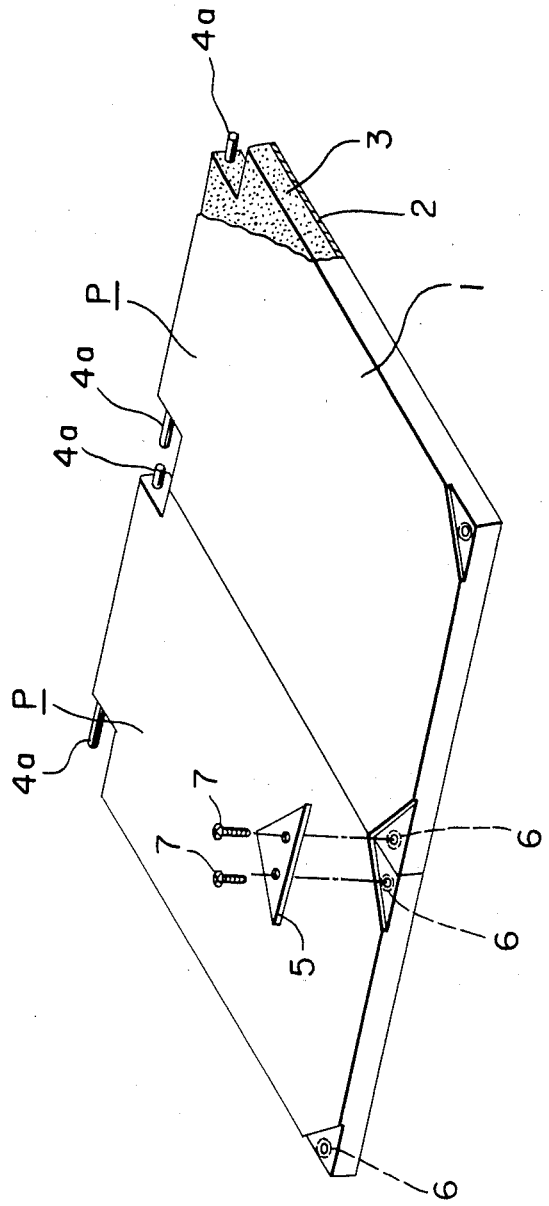
FIG. 1 is a perspective view showing one embodiment of the warming panel to be an object of the present invention.
Figure 2:
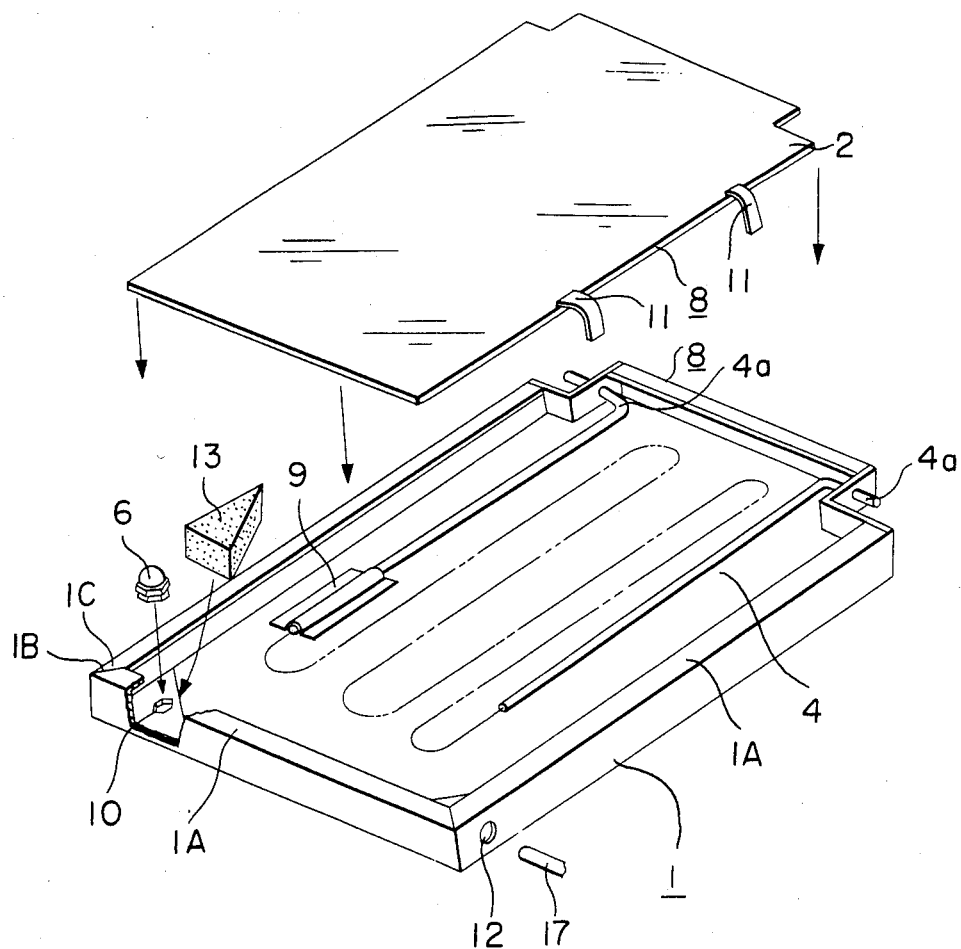
FIG. 2 is an explanatory diagram showing a structure of the outer shell structure.
Figure 5:
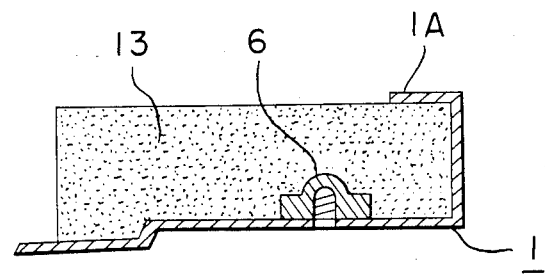
FIG. 5 is an enlarged cross-sectional view taken along a line V—V in FIG. 4.

In the following, the present invention will be explained in detail with reference to preferred embodiments thereof, taking a floor warming panel as an example. FIGS. 1 through 5 illustrate the floor warming panel to attain the primary object of the present invention as described in the foregoing. In the drawing, the floor warming panel (P) as one embodiment of the present invention is in a planar shape, and has such a structure that a heat insulating layer (3) of hard urethane foam, etc. is formed by charging it in a space between a front surface plate (1) made of a sheet metal and a rear surface plate (2) made of a sheet metal or an appropriate heat insulating board. A conduit tube (4) for heat medium such as heated water or freon gas, etc. is formed of copper or plastic material, the entire portion of which is embedded in the heat insulating layer (3), except for its connecting ends (4a), as shown in FIG. 1. Those adjacent corner portions on the outer surface side of the front surface plates (1) are so designed that they can be connected with a triangular connecting plate (5) which covers the two floor warming panels (P) in a manner to be screw-fitted from the outer surface sides. This screw-fitting of the connecting plate (5) is done by screwing of a tightening screw (7) into a stud nut (6), as one example of the fixed part as embedded in the interior of the front surface plate. Also, a flange (1A) is formed by bending the surrounding edges of the front surface plate (1) at the right angle, the adjacent ends (1C) of which are merely abutted.

By the way, the floor warming panel (P) as mentioned above is placed on the floor surface of a building in such a manner that the front surface plate (1) may face upward. And then, by circulating a heat medium such as, for example, a high temperature water into the interior of the conduit tube (4) from one end of it, the heat of the warm water is discharged through the front surface plate (1) to effect the floor warming.

The floor warming panel (P) of such construction is generally manufactured by arranging and fixing the conduit tube (4) in a tortuous form on the inner surface side of the front surface plate (1), followed by fitting thereto the rear surface plate (2) to form an outer shell structure (8) of a hollow planar construction as a whole, then injecting liquid of the heat insulating material such as urethane foam, etc. at a high speed into the interior space of the outer shell structure (8) to fill by its foaming action the space between the front surface plate (1) and the rear surface plate (2), thereby forming the stabilized heat insulating layer (3) of urethane foam, etc. within the outer shell structure (8) enclosing the conduit tube (4). The panel as one example of application of the present invention is basically manufactured by following the above-described production steps. In more detail, the conduit tube (4) is secured in such tortuous form by use of a fixing means such as aluminum tape (9) on the inner surface side of the front surface plate (1) with the flanges (1A), on which the rear surface plate (2) is to be abutted, being formed by integrally bending its surrounding edge portions from the lateral side, and then the stud nut (6) to be a counter-part of the tightening screw (7) to be screwed in for fixing the triangular connecting plate (5) is fitted into a polygonal hole (10) formed in the corner part at two portions of the front surface plate except for the lead-out portions of the connecting end (4a) of the conduit tube (4), and adapted to the shape of the stud nut (6) such as hexagonal shape, etc., the nut being fitted thereinto from the back surface side and fixed tentatively.

In the next place, the rear surface plate (2) is mounted on the flanges (1A) at the back of this front surface plate (1) in registration therewith, while maintaining an appropriate assembling relationship between the front surface plate (1) and the rear surface plate (2) by means of a fixing tape (11), etc., thereby forming the outer shell structure (8) of a hollow planar construction with the conduit tube (4) being provided in its interior.

The outer shell structure (8) has a charging port (12) formed in advance at its one part near the corner where the connecting plate (5) is attached to one surface side thereof, and it has a buffer material (13) made of soft urethane foam, etc. mounted at its another corner opposite to the charging port (12) in a manner to cover the front side of the stud nut (6) which has been tentatively secured in the polygonal hole (10), i.e., the side of the charging port (12). Thus, the floor warming panel (P) can be completed, as shown in FIG. 3, by setting the outer shell structure (8) in a space between the upper mold (14) and the lower mold (15) of a press mold for injecting the insulating material with the rear surface plate (2) facing upward and with spacers (16) of aluminum or iron being positioned between the upper and lower molds, then lowering the upper mold (14) in the direction shown by an arrow mark, followed by connecting an injection nozzle (17) of a high pressure injector (not shown in the drawing) with the charging port (12) in a state of the entire circumference and both upper and lower surfaces of the outer shell structure being confined in the press mold, and injecting the liquid of hard urethane foam, etc. at a high speed and under a charging pressure of, for example, 100 kg/cm$^2$, into the outer shell structure (8) to cause the same to foam within it, thereby forming the integral layer of the heat insulating material having the rigidity throughout the structure. Incidentally, the pressure at the time of the foaming is 2 kg/cm$^2$ in this embodiment.

At the formation of the heat insulating layer (3), fairly vigorous impact force is applied to the portion of the outer shell structure where the injected liquid directly impinges. In the case of the present embodiment, however, the buffer material (13) is provided at the portion where the liquid is impinged, whereby, even if any connected portions such as, for example, an abutting portion (1B) between the flanges (1A) and (1A) of the front surface plate (1), or the stud nut (6), are positioned at that portion, they will not be deformed, damaged, or displaced by collision of the liquid thereto. Hence there is substantially no possibility of disqualified product being yielded by such cause. Further, since the buffer material (13) absorbs the liquid and does not interfere with the circumventing liquid, the formation of the heat insulating layer (3) in the outer shell structure (8) can be effected as has been done so far, whereby the buffer material (13) and the heat insulating layer (3) are ultimately brought to an integral and inseparable whole.

Figure 6:
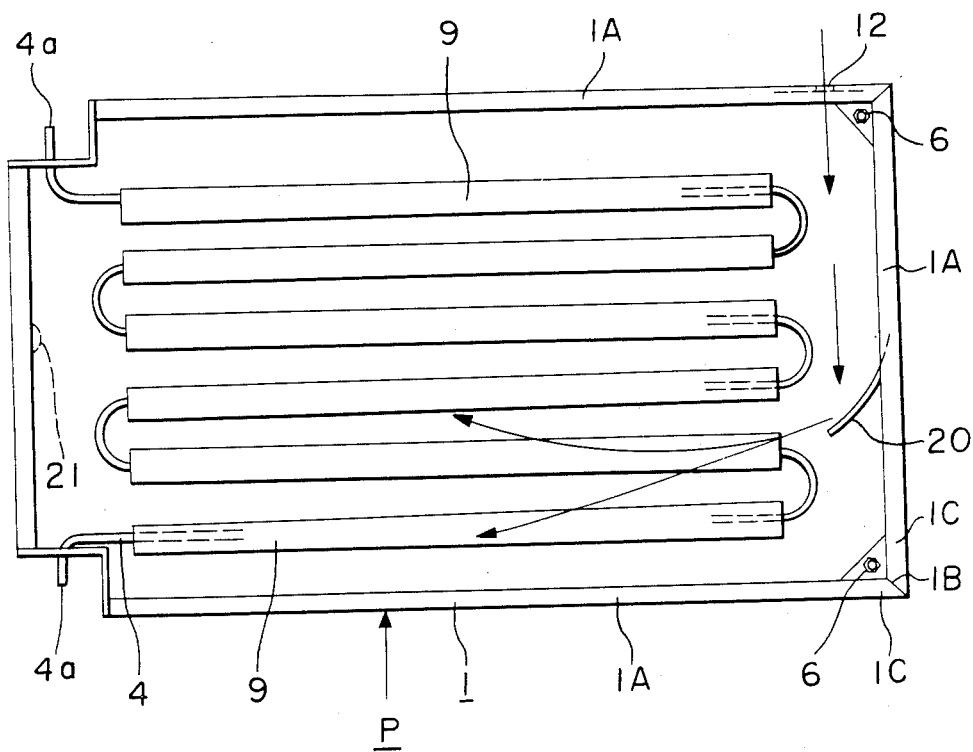
FIG. 6 is an explanatory diagram of a floor warming panel, which shows another embodiment of the warming panel according to the present invention.

FIG. 6 illustrates another embodiment to attain the above-mentioned second object of the present invention. In the drawing, the outer shell structure (not shown in the drawing) same as that of the preceding embodiment has the charging port (12) formed in the vicinity of the corner part where the connecting plate is mounted to one side part thereof, and a flow guide plate (20) in a curved form to direct the liquid injected from the charging port (12) to the center of the outer shell structure interior as well as to the diagonal direction of the charging port (12) thereof is fixed by means of a tape, etc. at the middle part between the charging port (12) and the corner part opposite to it in a manner to be aslant with respect to the inner surface of the outer shell structure. By the way, the flow guide plate (20) is made of a material such as, for example, metal and plastic materials. The other construction than that as mentioned above is identical with that shown in FIGS. 1 through 5; hence the explanations thereof will be dispensed with.

As the consequence of this, even in this embodiment, the warming panel (P) can be completed in the same manner as the embodiment shown in FIGS. 1 through 5 by connecting the injection nozzle (17) of the high pressure injector (not shown in the drawing) with the charging port (12), and injecting the liquid of urethane foam, etc. at a high speed into the outer shell structure to cause it to foam in its interior to thereby form the integral heat insulating layer (3). At the time of forming the heat insulating layer (3), there is applied a fairly vigorous impact force onto the portion where the liquid immediately after its injection is impinged. In the case of this embodiment, however, the portion where the liquid is impinged has the flow guide plate (20), and no connected portions or stud nut (6) of the outer shell structure are provided. Thus, not only is there no possibility of such connected portions or stud nut being deformed, damaged, or displaced by collision thereto of the liquid, but also the flowing direction of the injected liquid within the outer shell structure is restricted by the flow guide plate (20) and there is no possibility of the liquid moving around the circumferential portion of the outer shell structure. On account of this, unfilled portion, i.e., mold cavity, is not formed at the center part of the outer shell structure, i.e., the front surface plate (1) which is structurally unstable, or, even if such mold cavity is created, it will be formed at a particular location (21) to the side of the end surface of the outer shell structure where no structural problem is present. Accordingly, a rate of yield of disqualified product due to the abovementioned cause becomes remarkably reduced.

As is apparent from the foregoing two embodiments, the first embodiment of the present invention provides the buffer material to prevent the liquid from directly impinging on the fixed parts or connected portions on the outer shell structure in a manner to be opposite to the charging port of the liquid of the heat insulating material, whereby displacement of the fixed parts, or damage or deformation of the connected portions to be brought about by collision thereto of the liquid with its injection under a high pressure can be well prevented, and the production of disqualified product can be effectively reduced.

Further, the second embodiment of the present invention provides, in the outer shell structure, the flow guide plate which restrains the flowing direction of the injected liquid at a high speed in such a manner that the ultimate charging portion thereof may come to a predetermined end surface side of the outer shell structure. With such member, therefore, the displacement in the fixed parts, or damage or deformation of the connected portions to be brought about by collision thereto of the liquid accompanied by its injection can be well prevented. Moreover, the unfilled portion of the injected liquid can be formed not at the center part of the outer shell structure which is structurally unstable, whereby a rate of yield of disqualified product can be effectively reduced to a remarkable extent.

FIGS. 7 and 8 illustrate still other embodiments of the present invention. These two embodiments respectively adopt the concept of the afore-described first and second embodiments of the present invention.

That is to say, the characteristic of these two embodiments are such that, in order to prevent the charging liquid from directly impinging on the stud nut (6) as one of the fixed parts and the connected portion (1B), etc. as well as to restrain the flowing direction of the charging liquid, the buffer material (13) as mentioned in reference to FIGS. 1 through 5 is overlayed on one side surface of the flow guide plate (20) to thereby form an integral guide member (30).

These embodiments provide the same function and resulting effect as those already mentioned with respect to the embodiments shown in FIGS. 1 through 6, and can simultaneously satisfy restriction of the flowing direction of the charging liquid and buffering thereof by the single guide member (30) by integral combination of the buffer plate (13) and the flow guide plate (20), which are therefore preferable from the aspects of reducing the number of constituent parts and ease in manufacture of the panel.

By the way, it is apparent that, in these embodiments, the buffer material (13) and the flow guide plate (20) are not necessarily made integral.

What is claimed:

1. Intermediate structure for use in forming an insulated warming panel, said intermediate structure comprising:
    (a) an outer shell structure of a hollow planar construction, said outer shell structure comprising a front surface plate, a rear surface plate, and a plurality of side walls extending between said front surface plate and said rear surface plate;
    (b) a conduit tube for passing heat medium therethrough disposed in the interior of said outer shell structure;
    (c) a charging port for heat insulating material which is liquid when charged, said charging port extending from the exterior to a volume in the interior of said outer shell structure in which the heat insulating material is initially received, said charging port extending through a first one of said plurality of side walls and defining the initial flow path of the heat insulating material into the interior of said outer shell structure; and
    (d) a flow guide plate disposed in the interior of said outer shell structure in the initial flow path of the heat insulating material into the interior of said outer shell structure, said flow guide plate:
        (i) defining one boundary of said volume;
        (ii) projecting from a second one of said plurality of side walls and extending toward a third one of said plurality of said walls opposite to said second one of said plurality of side walls by a distance that is small relative to the distance between said second and third side walls; and
        (iii) being sized, shaped, and positioned so that, when a liquid heat insulating material is charged into the interior of said outer shell structure through said charging port, it impinges upon said flow guide plate and is redirected thereby before it strikes the inner surface of said outer shell structure opposite said charging port.

2. Intermediate structure as recited in claim 1 wherein said flow guide plate is mounted on an inner wall of the interior of said outer shell structure and projects inwardly from said inner wall.

3. Intermediate structure as recited in claim 1 wherein:
    (a) the interior of said outer wall structure is polygonal in plan view and
    (b) said flow guide plate projects inwardly from one wall of the interior of said outer shell structure.

4. Intermediate structure as recited in claim 1 wherein said front and rear surface plates and said plurality of side walls of said outer shell structure forms:
    (a) a first component in the shape of an open-faced parallelepipedal box and
    (b) a second component in the shape of a planar cover which closes the open face of said open-faced parallelepipedal box.

5. Intermediate structure as recited in claim 1 and further comprising a resilient buffer piece disposed in the interior of said outer shell structure, said resilient buffer piece making surface contact with the side of said flow guide plate opposite to the side against which the liquid heat insulating material impinges and providing support thereto.

6. Intermediate structure as recited in claim 5 wherein said resilient buffer piece extends between said flow guide plate and an inner wall of said outer shell structure which is opposite to said charging port.

7. Intermediate structure as recited in claim 1, wherein said plurality of side walls define a rectangle.

8. Intermediate structure as recited in claim 1, wherein:
    (a) said charging port is located in close proximity to said second one of said plurality of side walls and
    (b) the initial flow path of the heat insulating material into the interior of said outer shell structure is at least approximately parallel to said second one of said plurality of side walls.

* * * * *